US010692273B2

(12) United States Patent
Assmann et al.

(10) Patent No.: US 10,692,273 B2
(45) Date of Patent: Jun. 23, 2020

(54) IN-CONTEXT PHOTOREALISTIC 3D VISUALIZATION FOR SURGICAL DECISION SUPPORT (71) Applicant: Siemens Healthcare GmbH, Erlangen (DE)

(72) Inventors: Stefan Assmann, Erlangen (DE); Klaus Engel, Nuremberg (DE); Kaloian Petkov, Lawrenceville, NJ (US); Ruth J Soenius, New York, NY (US); Daphne Yu, Yardley, PA (US)

(73) Assignee: SIEMENS HEALTHCARE GMBH, Erlangen (DE)

(*) Notice: Subject to any disclaimer, the term of this patent is extended or adjusted under 35 U.S.C. 154(b) by 0 days.

(21) Appl. No.: 15/610,804

(22) Filed: Jun. 1, 2017

(65) Prior Publication Data
US 2018/0350129 A1  Dec. 6, 2018

(51) Int. Cl.
G06T 15/08 (2011.01)
G06T 15/06 (2011.01)
G06T 15/30 (2011.01)

(52) U.S. Cl.
CPC .............. G06T 15/08 (2013.01); G06T 15/06 (2013.01); G06T 15/30 (2013.01); G06T 2210/41 (2013.01)

(58) Field of Classification Search
CPC ................. G06T 15/08; G06T 15/06
(Continued)

(56) References Cited

U.S. PATENT DOCUMENTS

2005/0065425 A1* 3/2005 Matsumoto ............ G06T 15/06
600/407

2007/0195088 A1* 8/2007 Engel ...................... G06T 15/08
345/424
(Continued)

FOREIGN PATENT DOCUMENTS

JP 2011200825 A 10/2011
JP 2016202247 A 12/2016

OTHER PUBLICATIONS

Rodriguez-Aguilera Alejandro et al: "Spatial Opacity Maps for Direct Volume Rendering of Regions of Interest"; Computer Graphics Conference, Jan. 1, 2016 (Jan. 1, 2016); XP055511133; DOI: 10.2312/ceig.20161310 Retrieved from the Internet: URL:http://wpd.ugr.es/-alejandrora/wp-content/uploads/2016opacitymaps.pdf; 2016.
Abellan Pascual et al: "Regions-based illustrative visualization of multimodal datasets"; Computerized Medical Imaging and Graphics, vol. 37, No. 4, 2013, pp. 263-271; XP028680878; ISSN: 0895-6111, DOI: 10.1016/J.COMPMEDIMAG.2013.04.002; 2013.
(Continued)

Primary Examiner — Hai Tao Sun
(74) Attorney, Agent, or Firm — Harness, Dickey & Pierce, P.L.C.

(57) ABSTRACT

An embodiment suggests a method for visualizing an image data set, in particular a medical image data set, wherein the visualized data set displays a three dimensional arrangement having at least a first object and a second object. The method includes assigning a first set of parameter to the first object; assigning a second set of parameters to the second object; dividing the medical image data set into a first sub-region and a second sub-region; and providing a visualisation of the three dimensional arrangement by a volume rendering method, in particular by a ray-casting method or a photorealistic volumetric path tracing, the first set of parameter being applied to the first sub-region for visualizing the first object and the second set of parameter being applied to the second sub-region for visualizing the second object.

22 Claims, 3 Drawing Sheets (58) Field of Classification Search
USPC .......................................................... 345/426
See application file for complete search history.

(56) References Cited

U.S. PATENT DOCUMENTS

| | | | |
|---|---|---|---|
| 2007/0229500 A1* | 10/2007 | Engel .................... | G06T 15/08 345/422 |
| 2009/0002366 A1* | 1/2009 | Kanitsar ................ | A61B 6/032 345/419 |
| 2013/0070984 A1 | 3/2013 | Shirasaka et al. | |
| 2016/0048998 A1* | 2/2016 | Sarel .................... | G06F 9/455 345/426 |
| 2016/0140754 A1* | 5/2016 | Matjasko ............... | G06T 15/00 345/426 |
| 2016/0275681 A1* | 9/2016 | D'Alessandro ....... | G06T 3/4038 |

OTHER PUBLICATIONS

Bruckner Stefan et al.: "Illustrative Context-Preserving Volume Rendering"; Jan. 1, 2005 (Jan. 1, 2005); XP055511142; DOI: 10.2312/VisSym/EuroVis05/069-076; Retrieved from the Internet: URL:https://www.cg.tuwien.ac.at/research/publications/2005/bruckner-2005-ICV/bruckner-2005-ICV-Paper.pdf; 2005.
Partial European Search Report for corresponding European Application No. 18170874.4 dated Oct. 8, 2018.
Japanese Office Action dated May 21, 2019 issued in corresponding Japanese Application No. 2018-094673 (English translation provided).
European Search Report dated Jan. 9, 2019 issued in European Application No. 18170874.4.
Japanese Office Action dated Jan. 21, 2020 issued in Japanese Patent Application No. 2018-094673.

* cited by examiner

IN-CONTEXT PHOTOREALISTIC 3D VISUALIZATION FOR SURGICAL DECISION SUPPORT

FIELD

Embodiments of the invention describes a method for visualizing an image data set, in particular medical image data set, a system for visualizing image data set and a computer program product.

In particular, an embodiment of the method deals with efficient visualization of multiple structures of interest within three-dimensional (3D) or four-dimensional (4D) medical images in context with each other. For example, the method can be applied to visualize feeding vasculatures or implants in context with organs containing tumors. One or more medical image data sets can be used as the source data. For example, the medical image data sets are generated by computer tomography (CT) or magnetic resonance (MR).

BACKGROUND

Volume visualization of such medical image data sets provides a way to review anatomy in 3D/4D. Powerful tools of volume visualization methods use various intensity classifiers to select tissues and structures in the data set and map each intensity to a corresponding color, opacity, and material property values (e.g. diffuseness, shininess, reflection, refraction, transmittance, emittance, phase functions).

According to one advanced volume visualization method such as path tracing, the classified values are accumulated along a complex path based on the utilized material properties interacting with a lighting model to reveal a much more photorealistic perception about the contained tissues and organs. The method can also be used with another simpler volume visualization method such as ray casting, where the classified values are accumulated along a viewing ray and as a result the accumulated colour-value and/or opacity-values are perceived on the visualized surface of the objects.

Parts inside each classified tissue or structure, such as a tumor embedded inside an organ, are additionally revealed by defining a region of interest and removing the occluding regions outside of it. A simple clipping plane, for example, is particularly effective and efficient. A clipping plane define a half space as a region of interest while the region in the other half space is clipped.

The position and/or orientation of the clipping plane determines the part of the image data set that is visualised. Thus, a user can navigate through moving the plane to review the internals inside organs. However, simultaneously, the clipping plane also clips away parts of the structures of interest, and consequently the user loses the information of the relative positioning of multiple structures, e.g. the vessels surrounding the organ. However, this information is of special interest, since the position of the vessels next or near to the organ restricts the freedom of action during a surgery.

Alternatively, for simultaneously displaying multiple parts and structures, for example the tumors and the respective feeding vessels, the state of the art suggests a segmentation. That means each structure of interest is explicitly determined for each voxel. However, this method is tedious and time consuming since it is difficult to automate segmentation of abnormal, diseased anatomy with a resolution often not sufficient to extract fine vessels. Moreover, a manual editing is needed, when the segmentation fails.

SUMMARY

An embodiment of the present invention provides an improved method for visualizing multiple embedded structures in context of each other.

An embodiment of the present invention is directed to a method for visualizing an image data set; an embodiment of the present invention is directed to system for visualizing an image data set; and an embodiment of the present invention is directed to a computer program product.

According to a first embodiment of the present invention, a method for visualizing an image data set, in particular a medical image data set, is provided, wherein the visualized data set displays a three-dimensional arrangement having at least a first object and a second object, comprising:
- assigning a first set of parameters, i. e. a reference set of parameters, to the first object;
- assigning a second set of parameters, i. e. an in-context set of classification parameters, to the second object;
- dividing the medical image data set into a first sub-region, i.e. a reference sub-region, and a second sub-region, i. e. an in-context sub-region, in particular in regions of interest; and
- providing a visualisation of the three dimensional arrangement by a volume rendering method (VRM), in particular by a ray casting method or a volumetric path tracing method, wherein the first set of parameter is applied to the first sub-region for visualizing the first object and the second set of parameter is applied to the second sub-region for visualizing the second object.

Further advantageous embodiments and features of the invention are given by the claims, as revealed in the following description. Feature of different claim categories may be combined as appropriate to give further embodiments not described herein.

Another embodiment of the present invention is a system for visualizing an image data set, in particular a medical image data set, wherein the visualized data set displays a three dimensional arrangement having at least a first object and a second object located, comprising a device configured for
- assigning a first set of classification parameter to the first object;
- assigning a second set of classification parameters to the second object;
- dividing the displayable volume in a first sub-region and second sub-region; and
- providing the visualizing of the three dimensional arrangement by a volume rendering method, in particular by a path tracing method, wherein the first set of classification parameter is applied to the first sub-region and the second set of classification parameter is applied to the second sub-region. Preferably, the system comprises a processor, a display device such as a screen and/or an input device as human machine interface.

Another embodiment of the present invention is a computer program product for carrying out the steps of the method according at least one embodiment of the present invention, when the computer program product is loaded into a memory of a programmable device.

BRIEF DESCRIPTION OF THE DRAWINGS

Further advantages and features will emerge from the following description of preferred embodiments of the method for analysing according to the invention with reference to the accompanying drawings. Individual features of the individual embodiments can be combined with one another here within the scope of the invention.

In the drawings.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment of the present invention, a method for visualizing an image data set, in particular a medical image data set, is provided, wherein the visualized data set displays a three-dimensional arrangement having at least a first object and a second object, comprising:
  assigning a first set of parameters, i. e. a reference set of parameters, to the first object;
  assigning a second set of parameters, i. e. an in-context set of classification parameters, to the second object;
  dividing the medical image data set into a first sub-region, i.e. a reference sub-region, and a second sub-region, i. e. an in-context sub-region, in particular in regions of interest; and
  providing a visualisation of the three dimensional arrangement by a volume rendering method (VRM), in particular by a ray casting method or a volumetric path tracing method,
wherein the first set of parameter is applied to the first sub-region for visualizing the first object and the second set of parameter is applied to the second sub-region for visualizing the second object.

In contrast to the state of the art, the method according to an embodiment of the present invention enables visualizing the second object or at least a part of the second object in the second sub-region instead of clipping away the part of the second object being located in the second sub-region. In particular, at least a part of the first object is simultaneously clipped away in the second sub-region. In other words: Due to the method according to an embodiment of the present invention the visualized data show a part of the first object located in a first visualized sub-region, in particular on a screen, on one hand and simultaneously a part of the second object located in a second visualized sub-region, in particular on a screen, on the other hand.

Preferably, a processor is provided, wherein the processor is configured at least for providing a visualisation of the three dimensional arrangement by a volume rendering method (VRM) and displays the visualized part of the first object in the first visualized sub-region and the visualized part of second object in the second visualized sub-region on a screen, such as a screen of a workstation. In particular, the first visualized sub-region and the second visualized sub-region are located adjacent to each other on the screen.

Consequently, an inner structure of the first object, for example the inner structure of an organ such as a liver, can be displayed in the first virtualized sub-region and simultaneously at least a part of the second object is visualized in the second visualized sub-region for identifying the relative position between the first object and the second object. The first object is preferably an organ and the second object is a vessel or an implant. It is also thinkable that the second object is a tumour being located inside the first object, namely the organ. In particular, the first object and the second object extend over the first sub-region and the second sub-region. For sake of clarity it is to be understood by the skilled person that the invention is not limited to the first object and the second object and can be extended to any number of objects.

Generally, the first set of parameters and/or the second set of parameters are part of the volume rendering method, i. e. they can be incorporated into the volume rendering method, and influence an output of the volume rendering method. By adapting the first set of parameters and/or the second set of parameters to imaging characteristics of the first object and/or the second object, such characteristics as a corresponding range in the Hounsfield scale, it is possible to concentrate the visualisation process, in particular the volume rendering method, on the first object in the first sub-region and on the second object in the second sub-region.

In particular, it is provided that a combined effect of clipping, classification and lightning are accumulated as the ray path are advanced through the volume in a given lighting and camera parameterization. Preferably, it is provided, that the first set of parameter is optimized for the first object and the second set of parameters is optimized for the second object. In particular, the term "optimizing" means that the first set of parameter is chosen such, that the volume rendering method (VRM) causes a non-vanishing value for the first object and a mostly vanishing value for the second object. For example, it is provided, that the first parameter set and the second parameter set are chosen on basis of different Hounsfield ranges that are respectively assigned to the first object and the second object.

Preferably, the second sub-region represents the part of the image data set that is clipped away for seeing inside the first object. Furthermore, it is preferably provided, that the image data set is a medical image data set such as a data set generated by computer tomography (CT) or magnetic resonance (MR). For example, the data set is a three-dimensional or four dimensional data set. Thereby, the data set comprises a density, i. e. a density value, for each volume element of the first object and the second object. The density might be a physical density, an optical density, a refraction index, and/or an intensity-, a colour, a transparency and/or a opacity-value and might be presented as scalar value, vector or tensor.

By knowing the spatial relation and the context of the first object, namely the position of the second object, a surgeon might decide on a best angle to approach a target without hurting a vessel. Further, the surgeon comes to faster decision, whether a patient is operable or not, and can show patients what they are going to do and what the risks are. In addition, novice surgeons and students can be trained on difficult cases.

Further advantageous embodiments and features of the invention are given by the claims, as revealed in the following description. Feature of different claim categories may be combined as appropriate to give further embodiments not described herein.

According to a preferred embodiment, it is provided that one set of classifier resource is used in the volume rendering method for both the first sub-region and the second sub-region. By using the same classifier resources, the amount memory usage and the amount of fetches into the computer memory is minimized and therefore improve rendering speed.

The term "classifier resource" represents in the context of the present invention the basic colour palette that provides the mapping of corresponding intensity value of the image data set to a brightness-, an intensity-, a colour, a transparency and/or an opacity-value. By applying the classifiers, inner structures, which are characterized by different intensity-values, become visible. In this approach, speed and memory are optimized and colour consistency is better preserved across the regions. Furthermore, by using the same classifier resource with different variation of offsets and materials for each subregions applied at runtime, the volume rendering method is simplified compare to using completely independent sets of resources for each region, such that, an available computation time can be utilized to perform higher quality interactive images in the path tracing algorithm, leading to a production of a more accurate photorealistic rendering.

In a preferred embodiment it is provided, that parameters of the first set of parameters and/or the second set of parameters are material parameters, i.e. classification parameters. Material parameters are for example parameters that defines tissue or regional density weights, or tissue or region specific diffuseness, shininess, reflection, refraction, transmittance, emittance, phase function assigned to the volume element of the image data set.

Preferably, it is provided, that the image data set is divided into a first sub-region and a second sub-region by a clipping element, in particular a clipping plane. Thereby the clipping element defines a boundary between the first sub-region and the second sub-region, wherein the clipping element in particular refers to a visualized clipping plane dividing the first visualized sub-region and the second visualized sub-region on the screen.

In particular, the clipping element is located and orientated such that a visualized part of the first object is not displayed on the screen. In other words: the clipping element runs through the first object for analysing the inner structure or the first object.

It is also conceivable, that the clipping element or the visualized clipping element is at least partial curved. For example, it is provided, that the contour of the clipping element is adapted to the shape of the first and/or second object. Preferably, the user can select the preferred contour of the clipping element. It is also thinkable, that a further clipping element is provided in addition to the clipping element. Thus, it is possible for example to clip a part of the second object by the further clipping element in addition to clipping a part of the first object by the clipping element.

According to a preferred embodiment it is provided, that a volume rendering method is provided, comprising:
assigning the first set of parameters to a sampling point located in the first sub-region and/or
assigning the second set of parameter to a sampling point located in the second sub volume. Such a volume rendering method, also known as path tracing volume rendering method, advances a ray path through the volume to sampling each intersecting sampling point along a ray path, which may bounce, penetrate, or reflect from structures within the volume and ultimately become visible when it encounters light.

Preferably, it is provided, that the volume rendering method further comprises:
Disregarding a sampling point along a ray path, if the sampling point is located in the second sub-region and in particular a non-context mode is selected;
Applying the first set of classification parameters to the sampling point in the first sub-region; and
Applying the second set of classification parameters to the sampling point in the second sub-region, in particular if the in-context mode is selected.

Thus, it is advantageously possible selectively displaying the second object in the second visualized sub-region or not. In particular, the visualized part of second object is not displayed in the visualized second sub-region in the non-context mode and is displayed in the visualized second sub-region in the context mode. Consequently, the user can switch between the non-context mode and the context mode, for example, when a part of the second object in the second visualized sub-region disturbs the view on a part of the first object in the first visualized sub-region- For including complex illumination effects, it might be further provided taking into account a scattering event at each sampling point or volume element of the imaged data set, wherein a direction of the scattered ray is statistically distributed. Preferably, the scattering event might be implemented by a Monte-Carlo-Simulation and a final illumination value is a result of statistically averaging over each illumination value of a plurality of the rays.

Preferably, it is provided, that a MPR-mode is provided, wherein in the MPR-mode a multi-planar reformation (MPR) is additionally shown on the clipping element, in particular on the clipping plane, wherein preferably a selective opacity value is during a MPR mode rendering step. In general, the multi-planar reformation is visualized as a two dimensional cross section of the first and/or second organ, wherein the cross section corresponds to the current position of the clipping element in the first and/or second object.

In particular, it is provided, that a semi-transparent embedded MPR is mapped onto a surface of the clipping element, preferable onto the clipping plane, for addressing both a radiologist (who is used to the two dimensional cross-section view of the MPR) and a surgeon (who is used to the three dimensional visualisation). Provided the sampling point is located on the clipping element, an opacity value is checked in a MPR mode step. Based on the opacity value it is determined, whether the MPR sampling point is visible or not. For example, when the MPR is fully opaque in the sampling point, a MPR value is applied to the path in the sampling point. If the MPR is semi-transparent, the MPR value is stored and the ray continues its path through the volume. After finishing its path, the stored MPR value is combined with the value assigned to the finished path for representing a MPR-transparency value. It is also thinkable, that a two dimensional cross section corresponding to the current position or orientation of the clipping plane is displayed separately. For example, the two sectional cross section of the current clipping element is displayed next to the volume visualization.

In a preferred embodiment, it is provided, that the clipping element is movable, wherein preferably an amount of sampling is reduced during a movement of the clipping element (10). By moving the clipping element, it is possible to change the first sub-region and the second sub-region and consequently the first visualized sub-region and the second visualized sub-region. Preferably, the processor is configured such that the user can shift or rotate the clipping element or the clipping element is shifted or rotated automatically. Thus, a familiar scroll and "melt-through" effect is provided for navigating through the objects as the plane is shifted. Furthermore, it is provided, that the processor is configured for rotating the visualized three dimension arrangement.

Preferably, it is provided, that a sampling iteration for sampling points located on the clipping element is greater than the sampling iteration for sampling points located in the second sub-region and/or in the first sub-region. In particular, it is provided that the MPR-step is performed accurately for achieving a clean and noise reduced view of the MPR on the clipping element and consequently for achieving a clean melt-through effect. By performing less iteration behind the clipping element the objects behind the clipping element are more noisy but the visualized structures near to or on the clipping element are precise. Furthermore, it is conceivable, that a refinement is performed, such as a binary search, when the first object and/or second object are located near to the clipping element to ensure more precision at the boundary.

In another preferred embodiment, it is provided, that in a preparation step a data set is selected, wherein the data set comprises the image data set and a metadata information. By incorporating the metadata information additional information can be provided to the processor. Additional information includes for example information about the first object and/or the second object, about the patient or a disease. Preferably, the processor is configured such, that the method for visualizing an image data set is adapted automatically. It is also thinkable, that a workflow is provided for incorporating the metadata information, if the data set does not include metadata information.

Preferably, the term "automatically" indicates that a detector, for example being derived from a trained neural network, is used to detect the relevant metadata information such as the type of scan (e. g. arterials, venous, portal venous, contrast type). In particular, the detection is based on training from reviewing labelled image data sets. Consequently, a more reliable metadata information can be used to automatically determine of fine tune the default set of parameters, for example the relative and amount of variations between the classifier parameters of the first and second regions based on whether the vasculature contains enhanced contrast such as in an arterial phase dataset.

According to another embodiment of the present invention it is provided, that assigning the first set of parameters and the second set of parameters is automatically performed, preferably based on the metadata information. Preferably, there is a default first set of parameters for the first object and a default second set of parameter for the second object. These default sets of parameters are used by default by the processor, when the metadata information gives indications of the first and/or second object. Preferably, the default sets of parameters can be modified by the user for adapting the method to the individual image data set and its specific characteristics.

In a further preferred embodiment, it is provided that the image data set is automatically divided into a first sub-region and second sub-region, preferably based on the metadata information and in particular characteristics within the images. For example, the metadata information comprises the location of a tumour in an organ and the clipping element is orientated such, that the clipping element divides the first object in the proper position for getting the best view on the tumour. Preferably, the choice of the position and/or orientation of the clipping element is based on a database of trained networks, wherein the database comprises position and/or orientation of clipping elements in similar cases. It is also thinkable that the contour of the clipping element is automatically chosen based on the metadata information, in particular by using the detector.

For example, it is provided, that the metadata information, such as an indication from a medical image header and other attached information, is provided, and this information, together with the image content is used for identifying the first organ and performing an auto-dividing of the image data set into a first sub-region and a second sub-region. Subsequently, a potential disease, such as a tumour, is coarsely identified by performing an analysis of the first organ, in particular an intensity—texture analysis. Finally, the clipping plane is positioned in the desired location relative to the identified tumour in anterior orientation and the surrounding vessels, i. e. the second object, are displayed.

In another preferred embodiment it is provided, that the classification parameter is selected based on the metadata information or by a workflow.

Another embodiment of the present invention is a system for visualizing an image data set, in particular a medical image data set, wherein the visualized data set displays a three dimensional arrangement having at least a first object and a second object located, comprising a device configured for
- assigning a first set of classification parameter to the first object;
- assigning a second set of classification parameters to the second object;
- dividing the displayable volume in a first sub-region and second sub-region; and
- providing the visualizing of the three dimensional arrangement by a volume rendering method, in particular by a path tracing method, wherein the first set of classification parameter is applied to the first sub-region and the second set of classification parameter is applied to the second sub-region. Preferably, the system comprises a processor, a display device such as a screen and/or an input device as human machine interface.

Another embodiment of the present invention is a computer program product for carrying out the steps of the method according at least one embodiment of the present invention, when the computer program product is loaded into a memory of a programmable device.

Figure 1:
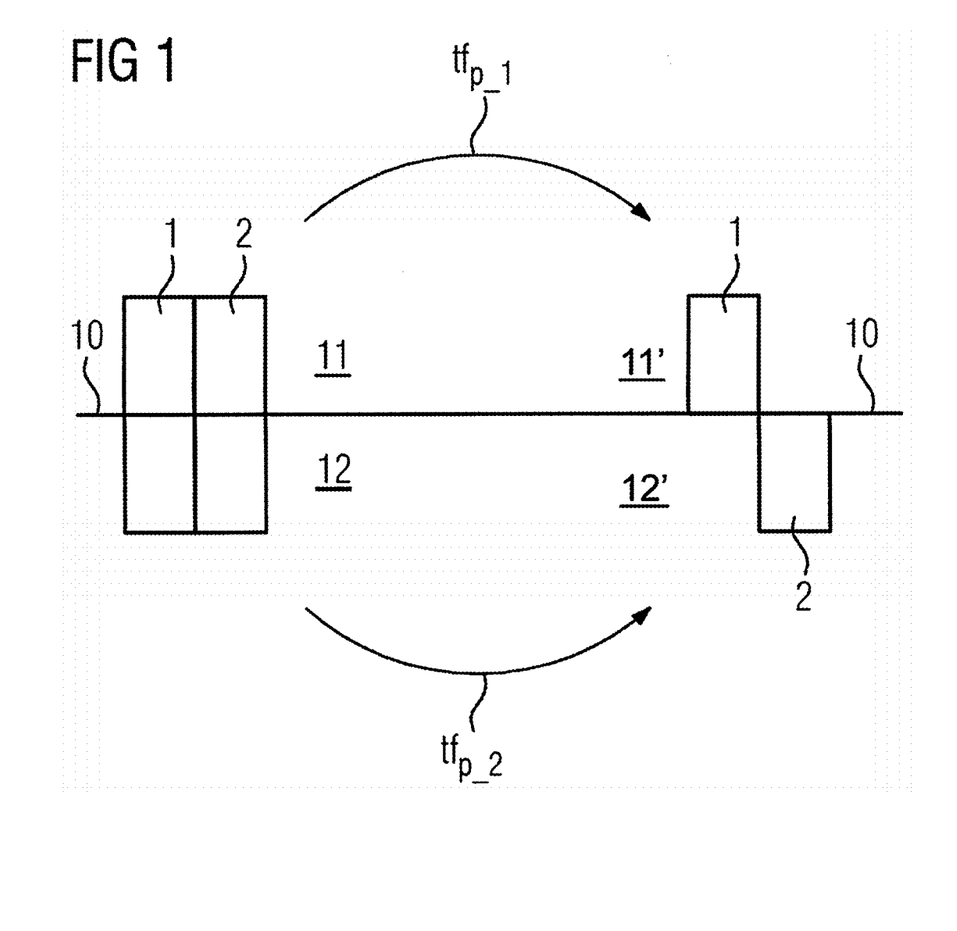
FIG. 1 shows schematically a preferred embodiment of a method for visualizing a three dimensional arrangement according to the present invention.

In FIG. 1 a method for visualizing an image data set, in particular a three dimensional image data set, is schematically illustrated. Preferably, the method is used for visualizing a first object 1 and a second object 2, which is different from the first object 1, wherein the first object 1 and the second object 2 are arranged to each other in a three-dimensional arrangement. Preferably, the image data set is a three dimensional medical image set generated by CT- or MR-imaging. For example, the first object 1 represents an organ, such as a liver, and the second object 2 represents a vessel or a device, such as an implant. Such vessels or devices are often embedded near the region of potential resection during a surgery. In other word: the first object 1 and the second object 2 are often located direct next to each other.

Volume visualization of CT or MRT images provides a means for surgeons to review the anatomy in 3D. Thereby, volume rendering methods utilized for volume visualization typically use transfer functions tf that select a value, such as a density assigned to a volume element of the image data set, and subsequently maps this value to a specific colour- and opacity-values. According to a ray casting method, the colour- and opacity-values are accumulated over several sampling points along a viewing ray and as a result, the accumulated colours are perceived on the surface of the visualized first object and visualized second object. Thereby each sampling point corresponds to a volume element of the image data set.

Internal parts inside the first object 1, for example inside the organ, might be revealed by positioning and/or orientating a clipping element 10, for example a clipping plane. Such a clip plane can be used to navigate through a tumour for identifying the location of the tumour within the first object 1, i. e. in the organ. However, by navigating to the tumour the clipping element 10 clips also vessels, i. e. the second object 2. Consequently, the surgeon cannot see the location of the vessels in relation to the tumour.

Alternatively, an image segmentation might be performed, wherein each picture element is respectively assigned to the first object 1 or the second object 2. This can result in a view that show the spatial relation of organ, tumour and vessels, but is comparatively tedious and time-consuming. Further, manual editing is need when automatically image processing fails.

For visualizing the spatial relation of the first object 1 and the second 2 object without increasing the image processing time significantly, a method is provided, comprising:
- assigning 21 a first set of parameter p_1 to the first object 1, for example an organ;
- assigning 21 a second set of parameters p_2 to the second object 2, for example a vessel or an implant;
- dividing 22 the image data set in a first sub-region 11 and second sub-region 12, preferably by the clipping element 10; and
- providing a visualisation of the three dimensional arrangement by a volume rendering method (VRM), in particular by a ray-casting method, wherein the first set of parameter p_1 is applied to the first sub-region 11 for visualizing the first object 1 and the second set of parameter p_2 is applied to the second sub-region 12 for visualizing the second object 2. Preferably, the method is configured such, that a visualized part of first object is presented in a first visualized sub-region 11' corresponding to the first sub-region 11 and a visualized part of the second object 2 is presented in a second visualized sub-region 12' corresponding to the second sub-region 12.

In particular, it is provided, that the volume rendering method (VRM) is applied to both the first sub-region and the second sub-region. Preferably, the first set of parameters p_1 is optimized for visualizing the first object 1 and the second set of parameters p_1 is optimized for visualizing the second object 2. As a consequence, the first object 1 is displayed in the first visualized sub-region 11' and the second object is simultaneously displayed in the second visualized sub-region 12', wherein the first object 1 is clipped away in the second visualized sub-region 12'. That means, it is advantageously possible to add the second object 2 or a part of the second object 2 located in the second sub-region 12 to the visualizing of the first object 1 in the first visualized sub-region 11', wherein the first object 1 is partially clipped. Thus, a surgeon see the spatial relation of the first object 1 and the second object 2 relative to each and simultaneous get information about the internal structure of the first object 1.

For example, the first object 1 and the second object 2 differs from each other with respect to their values in the Hounsfield-scale. For example, a first interval corresponding to relevant values for the first object 1 in the Hounsfield-scale differs from a second interval corresponding to relevant values for the second object 2 in the Hounsfield-scale. Thus, a first parameter set p_1 based on the first interval and a second parameter set p_2 based on the second interval are chosen. As a consequence, the classification applied to the first sub-region 11 maps only intensity values having a intensity of the first interval and the classification applied to the second sub-region 12 maps only density values having a density of the second interval 12. Advantageously, the same classification resources are used for both the first sub-region 11 and the second sub-region 12 and consequently the second object 2 and not the first object 1 is displayed within the second visualized sub-region 12'.

Figure 2:
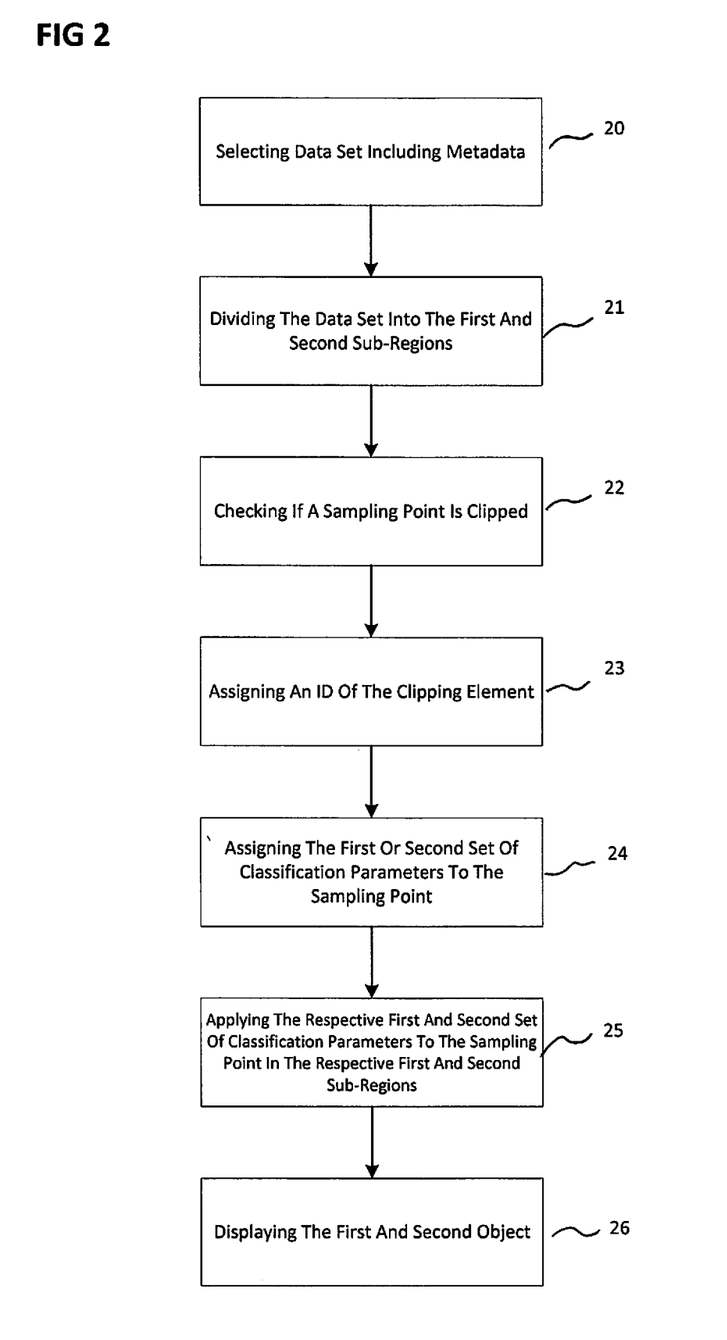
FIG. 2 shows a further preferred embodiment of a method for visualizing an image data set

In FIG. 2 a further preferred embodiment of a method for visualizing an image data set according to the present invention is illustrated. Preferably, a ray casting method or a path tracing based volume rendering method, is used. Such a ray casting method or a path tracing based volume rendering method advances a ray path through the volume to sampling each intersecting sampling point along the ray path. For incorporating the different classifications, which is used in ray casting method, the following steps are preferably provided:

Checking, if a sampling point of the displayed volume is clipped by the clipping element 10 and/or a further clipping element after dividing 22 the image data set into a first sub-region 11 and a second sub-region 12, Assigning an identification (ID) of the clipping element and/or the further clipping element to the sampling point and/or Assigning the first set of classification parameter or the second set of classification parameter to the sampling point.

The assignment of the respective sampling point or volume element in the image data set to the first sub-region 11 or second sub-region 12 labels each sampling point. As a consequence, the method for visualizing the image data set can be operated in different modes. For example, it is possible to hide a part of the second object 2 being clipped by the clipping element 10 and the further clipping element and it is possible to display a part of the second object 2 being clipped only by the further clipping element. Thus, the user can adapt the visualization to his preferences, in particular depending on the special requirements of the individual image data set.

Further, it is possible to select between a non-context mode and a context mode, wherein thus embodiment comprises the steps before displaying 26 the first object 1 and the second object 2 on the screen:

Disregarding 27 the sampling point, if the sampling point is clipped by the clipping element 10 and/or the further clipping element and an a non-context mode is selected;

Applying 25 a first set of classification parameters p_1 to the sampling point in the first sub-region 12, if an in-context mode is selected; and Applying 25 a second set of classification parameters p_2 to the sampling point in the second sub-region 12, if the in-context mode is selected.

Thus, a part of the second object is displayed in the context mode and not displayed in the non-context mode.

Preferably, a MPR mode is provided, wherein a multi-planar reformation, i. e. a two dimensional cross section 14, is additionally shown on the clipping element 10. Provided the sampling point is located on the clipping element 10, an opacity value is checked in a MPR mode step. Based on the opacity value, it is determined whether the sampling point contributes to the ray casting method or not. For example, when the MPR is fully opaque in the relevant sampling point, a MPR-value is applied to the path in the sampling point. If the MPR is semi-transparent, the MPR value is stored and the ray continues its path through the volume. After finishing its path, the stored MPR-value is combined with the value assigned to the finished path for representing a MPR-transparency value.

Furthermore, it is preferably provided, that the method comprises a preparation 20 step, wherein a data set is selected. Such a data set includes the image data set as well as a metadata information specifying the image data set, in particular the first object 1 and the second object 2. Preferably, the metadata information are selected by an analysing device or a detector having a processor, such as a computer main or a graphics processor unit memory. In particular, a set of rendering parameters are selected for applying to the subsequent rendering steps based on the metadata information or by a workflow that prompts the user to provide information. Such rendering parameters preferably contains path trace volume rendering parameter such as lighting parameters, camera parameters and classification parameters. Examples of light parameters are a type of lighting to be used, a number of light maps or light sources and/or a direction of the light source. Examples of camera parameters are a position, an orientation of a camera, a field of view, an aperture, a depth of field or an exposure. Examples of classification parameters are mapping of colour and transparency, a density, material properties (e. g. diffuseness, shininess, reflection, refraction, transmittance, emittance, phase function) or an intensity of each picture element.

Preferably, the first set of parameter p_1 and/or the second set of parameter p_2 are classification parameters, wherein the first set of classification parameter is optimized to the first object 1 and the second set of classification parameter is optimized to the second object 2.

Figure 3:
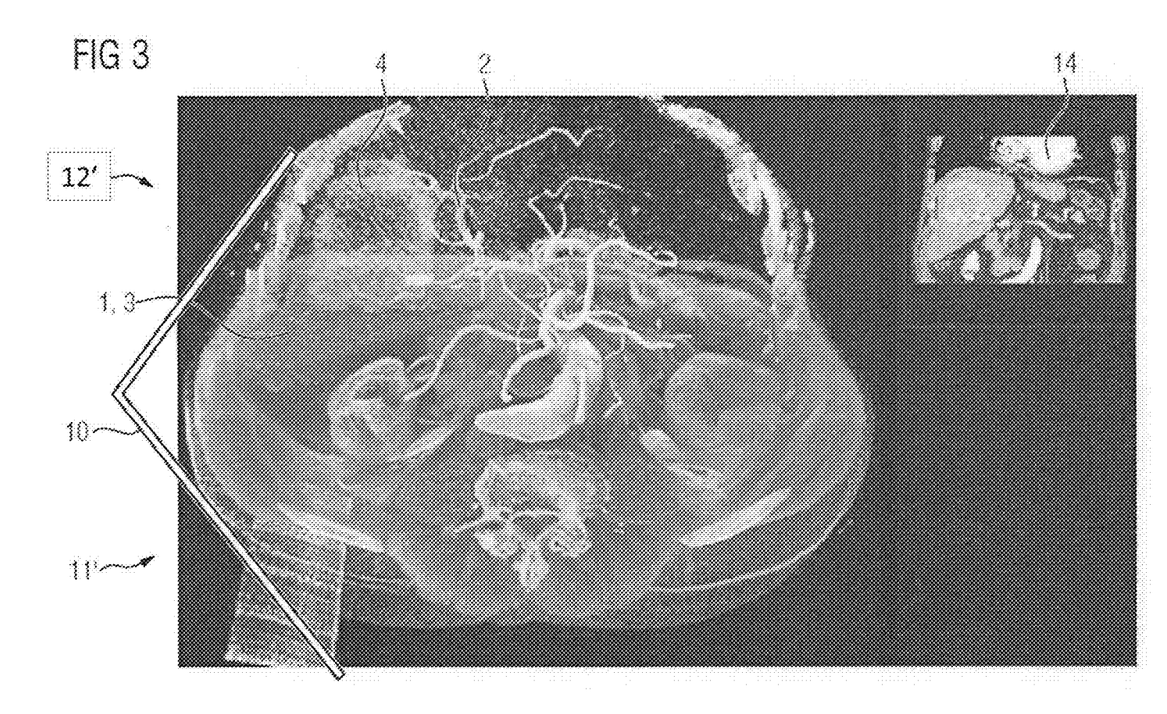
FIG. 3 shows a visualised three dimensional arrangement according to the present invention.

In FIG. 3 a visualized three dimensional arrangement of the first object 1 and the second object 2 is illustrated, wherein the first visualized sub-region 11' and the second visualized sub-region 12' are shown. In particular, FIG. 3 shows the illustration of a CT data set of a liver 3 containing a HCC liver tumour 4. The clipping plane 10 is chosen such that a part of the liver 3 (left hand side in the middle) has been clipped. As a consequence, the not-clipped part of the liver 3 is displayed in the first visualized sub-region 11, whereas the liver tumour 3 and surrounding vessels. i. e. the second object 12, are kept and displayed in the second visualized sub-region 12'. The tumour 4, actually within the liver 3, appears like a cloud on top of the not-clipped part of the liver 3. The vessels shows tumour feeding arteries plus among other. Furthermore, it is provided that a multi-planar reformation, i.e. a two dimensional cross section 14, corresponding to the current position and orientation of the clipping element 10, in particular the clipping plane that run through the liver 3, is shown together with the volume visualisation represented by the first visualized sub-region and the second visualized sub-region.

Although the present invention has been disclosed in the form or preferred embodiments and variations thereon, it will be understood that numerous additional modifications and variations could be made thereto without departing from the scope of the invention.

For the sake of clarity, it is to be understood that the use of "a" and "an" throughout this application does not exclude a plurality, and "comprising" does not exclude other steps or elements.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for visualizing an image data set which, when displayed, displays a three dimensional arrangement including at least a first object and a second object, comprising:
   assigning a first set of parameters to the first object;
   assigning a second set of parameters to the second object;
   dividing, by a clipping element, the image data set into a first sub-region and a second sub-region, the clipping element running through the first object and defining a boundary between the first sub-region and the second sub-region;
   providing a visualisation of the three dimensional arrangement including the first sub-region and the second sub-region by a volume rendering method, the volume rendering method using a same set of classifier resources for both the first sub-region and the second sub-region;
   applying the first set of parameters to the first sub-region for visualizing the first object and applying the second set of parameters to the second sub-region for visualizing the second object;
   disregarding a first sampling point along a path of a ray, upon the first sampling point being located in the second sub-region and a non-context mode being selected;
   applying the first set of parameters to a second sampling point in the first sub-region; and
   applying the second set of parameters to the first sampling point in the second sub-region, upon an in-context mode being selected, wherein
   a number of sampling iterations for sampling points on the clipping element is greater than a number of sampling iterations for sampling points in the second sub-region and the first sub-region.

2. The method of claim 1, wherein the applying includes applying a same set of basic classification colour templates for the first and the second sub-region, and
   wherein only opacity and material classification are respectively varied for the respective first sub-region and second sub-region.

3. The method of claim 1, wherein a multi-planar reformation (MPR)-mode is provided, wherein in the MPR-mode, the multi-planar reformation is additionally shown on the clipping element.

4. The method of claim 1, further comprising:
   moving the clipping element.

5. The method of claim 1, further comprising:
   selecting a data set, wherein the data set comprises the image data set and a metadata information.

6. The method of claim 1, wherein the assigning the first set of parameters and the second set of parameters is performed by a trained neural network.

7. The method of claim 1, wherein the image data set is divided into a first sub-region and second sub-region by a trained neural network.

8. The method of claim 1, wherein at least one of the parameters is selected based on metadata information or by a workflow.

9. A system for visualizing an image data set which, when displayed, displays a three dimensional arrangement including at least a first object and a second object located, comprising:
   a memory storing computer-readable instructions; and
   one or more processors configured to execute the computer-readable instructions such that the one or more processors are configured to
   assign a first set of classification parameter to the first object;
   assign a second set of classification parameters to the second object;
   divide, by a clipping element, the displayable three dimensional arrangement in a first sub-region and second sub-region, the clipping element running through the first object, the clipping element defining a boundary between the first sub-region and the second sub-region;
   provide the visualizing of the three dimensional arrangement including the first sub-region and the second sub-region by a volume rendering method, the volume rendering method using a same set of classifier resources for both the first sub-region and the second sub-region;
   disregard a first sampling point along a path of a ray, upon the first sampling point being located in the second sub-region and a non-context mode being selected;
   apply the first set of parameters to a second sampling point in the first sub-region; and
   apply the second set of parameters to the first sampling point in the second sub-region, upon an in-context mode being selected, wherein,
   the first set of classification parameters are applied to the first sub-region and the second set of classification parameters are applied to the second sub-region, and
   a number of sampling iterations for sampling points on the clipping element is greater than a number of sampling iterations for sampling points in the second sub-region and the first sub-region.

10. A non-transitory computer readable medium, including program code, for carrying out the method of claim 1 when the program code is executed by a programmable device.

11. The method of claim 1, wherein the image data set includes a medical image data set.

12. The method of claim 11, wherein the volume rendering method includes at least one of a ray-casting method or a photorealistic volumetric path tracing.

13. The method of claim 1, wherein the volume rendering method includes at least one of a ray-casting method or a photorealistic volumetric path tracing.

14. The method of claim 1, wherein the clipping element includes a clipping plane.

15. The method of claim 3, wherein a selective opacity value is applied during an MPR mode rendering step.

16. The method of claim 4, wherein an amount of sampling is reduced during a movement of the clipping element.

17. The method of claim 5, wherein assigning the first set of parameters and the second set of parameters is performed based on the metadata information.

18. The method of claim 5, wherein a classification parameter is selected based on the metadata information or by a workflow.

19. The system of claim 9, wherein the volume rendering method includes a ray-casting method.

20. The method of claim 1, wherein the first object corresponds to an organ, and the second object corresponds to at least one of a vessel associated with the organ, a device associated with the organ, or a tumour associated with the organ.

21. The method of claim 1, wherein the first set of parameters, the second set of parameters, or the first set of parameters and the second set of parameters include parameters that define density weights, specific diffuseness, shininess, reflection, refraction, transmittance, emittance, phase functions, a sub-combination thereof, or a combination thereof, for a tissue, a region, or a tissue and a region.

22. The system of claim 9, wherein the first set of parameters, the second set of parameters, or the first set of parameters and the second set of parameters include parameters that define density weights, specific diffuseness, shininess, reflection, refraction, transmittance, emittance, phase functions, a sub-combination thereof, or a combination thereof, for a tissue, a region, or a tissue and a region.

* * * * *